United States Patent
Shi et al.

(10) Patent No.: US 11,522,649 B2
(45) Date of Patent: Dec. 6, 2022

(54) METHOD FOR TRANSMITTING SRS, METHOD FOR RECEIVING SRS, AND RELATED DEVICES

(71) Applicant: VIVO MOBILE COMMUNICATION CO., LTD., Guangdong (CN)

(72) Inventors: Yuan Shi, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 162 days.

(21) Appl. No.: 16/647,727

(22) PCT Filed: Sep. 6, 2018

(86) PCT No.: PCT/CN2018/104289
§ 371 (c)(1),
(2) Date: Mar. 16, 2020

(87) PCT Pub. No.: WO2019/052390
PCT Pub. Date: Mar. 21, 2019

(65) Prior Publication Data
US 2020/0235962 A1     Jul. 23, 2020

(30) Foreign Application Priority Data
Sep. 15, 2017 (CN) .......................... 201710835407.X (51) Int. Cl.
*H04L 5/00* (2006.01)
*H04B 7/0456* (2017.01)
(Continued)

(52) U.S. Cl.
CPC ......... *H04L 5/0023* (2013.01); *H04B 7/0456* (2013.01); *H04L 5/0048* (2013.01);
(Continued)

(58) Field of Classification Search
None
See application file for complete search history.

(56) References Cited

U.S. PATENT DOCUMENTS

2013/0294333 A1* 11/2013 Chen ...................... H04L 5/0048
370/328
2014/0112168 A1* 4/2014 Chen ..................... H04B 7/0697
370/252
(Continued)

FOREIGN PATENT DOCUMENTS

| CN | 102332945 A | 1/2012 |
| CN | 104737489 A | 6/2015 |

OTHER PUBLICATIONS

Extended European Search Report dated Jan. 18, 2021 issued in PCT/CN2018/104289.
(Continued)

*Primary Examiner* — Andrew C Oh
(74) *Attorney, Agent, or Firm* — Brooks Kushman P.C.

(57) ABSTRACT

Provided in the embodiments of the present disclosure are methods for transmitting and receiving an SRS, and related devices. The method includes: receiving indication information transmitted by a base station and used to indicate a PRB bundling size; and transmitting, within at least one PRB bundle, the SRS to the base station, wherein the number of PRBs included in the at least one PRB bundle is equal to the PRB bundling size, and a same precoding is used by PRBs belonging to a same PRB bundle, and the precoding is determined by the UE itself.

11 Claims, 7 Drawing Sheets

(51) Int. Cl.
  *H04L 25/02* (2006.01)
  *H04W 72/04* (2009.01)
  *H04L 27/26* (2006.01)

(52) U.S. Cl.
  CPC ........ *H04L 5/0051* (2013.01); *H04L 25/0226* (2013.01); *H04L 27/261* (2013.01); *H04L 27/2602* (2013.01); *H04W 72/042* (2013.01); *H04W 72/0493* (2013.01)

(56) References Cited

U.S. PATENT DOCUMENTS

| | | | |
|---|---|---|---|
| 2015/0117350 A1* | 4/2015 | Seo | H04L 5/0048 370/329 |
| 2016/0360512 A1 | 12/2016 | Seo | |
| 2019/0140803 A1* | 5/2019 | Kim | H04J 11/0086 |

OTHER PUBLICATIONS

3GPP TSG RAN WG1 meeting #60bis; R1-101952; Beijing, China, Apr. 12-16, 2010; "DMRS PRB bundling discussion"; 5 pages.

3GPP TSG RAN WG1 Ad-hoc Meeting; R1-1700930; Spokane, USA Jan. 16-20, 2017; "Precoding granularity of NR DMRS"; 6 Pages.

3GPP TSG RAN WG1 Meeting #89; R1-1707947; Hangzhou, P.R. China May 15-19, 2017; "PRB bundling for NR DMRS"; 4 pages.

3GPP TSG RAN WG1#89; R1-1708499; Hangzhou, P.R. China, May 15-19, 2017; "Evaluation of intereaved CCE-to-REG control channel"; 5 pages.

3GPP TSG RAN WG1 Meeting #90; R1-1713766; Prague, Czech Republic, Aug. 21-25, 2017; "Codebook based transmission for UL MIMO"; 10 pages.

Partial Supplementary European Search Report dated Oct. 14, 2020 issued in PCT/CN2018/104289.

3GPP TSG RAN WG1 Meeting #88, RI-1701699, Athens, Greece Feb. 13-17, 2017, "UL SRS design for CSI acquisition and beam management", 8 pages.

3GPP TSG RAN WG1 Meeting #89, R1-1708130, Hangzhou, China, May 15-19, 2017, "Codebook based transmission for UL MIMO", 9 pages.

3GPP TSG RAN WG1 Meeting #90, R1-1712831, Prague, P.R. Czech, Aug. 21-25, 2017, "Discussion on Non-codebook Based UL Transmission", 6 pages.

3GPP TSG RAN WG1 Meeting NR#3, R1-1715795, Nagoya, Japan, Sep. 18-21, 2017, "Discussion on non-codebook based transmission for UL", 4 pages.

* cited by examiner

METHOD FOR TRANSMITTING SRS, METHOD FOR RECEIVING SRS, AND RELATED DEVICES

CROSS-REFERENCE TO RELATED APPLICATIONS

The present application is the U.S. national phase of PCT Application No.PCT/CN2018/104289 filed on Sep. 6, 2018, which claims a priority to Chinese Patent Application No. 201710835407.X filed in China on Sep. 15, 2017, the disclosures of which are incorporated herein by reference in their entireties.

TECHNICAL FIELD

The present disclosure relates to the field of communication technologies, and in particular, to a method for transmitting a Sounding Reference Signal (SRS), a method for receiving the SRS, and related devices.

BACKGROUND

In a communication system, a User Equipment (UE) needs to transmit an SRS to a base station to obtain an uplink Channel Quality Indicator (CQI). At present, before the UE transmits the SRS, it needs to receive a Precoding Matrix Indicator (PMI) transmitted by the base station, and receive SRS configuration information transmitted by the base station, and then transmit the SRS on a Physical Resource Block (PRB) corresponding to the SRS configuration information using a precoding indicated by the PMI. The base station performs channel estimation in a PRB by PRB manner after receiving the SRS, which results in lower performance of the channel estimation.

SUMMARY

In a first aspect, an embodiment of the present disclosure provide a method for transmitting an SRS, wherein the method is used to be applied to a UE and includes: receiving indication information transmitted by a base station and used to indicate a PRB bundling size; and transmitting, within at least one PRB bundle, the SRS to the base station, wherein the number of PRBs included in the at least one PRB bundle is equal to the PRB bundling size, and a same precoding is used by PRBs belonging to a same PRB bundle, and the precoding is determined by the UE itself.

In a second aspect, an embodiment of the present disclosure provide a method for receiving an SRS, wherein the method is used to be applied to a base station and includes: transmitting indication information used to indicate a PRB bundling size to a UE; receiving, within at least one PRB bundle, the SRS transmitted by the UE, wherein the number of PRBs included in the at least one PRB bundle is equal to the PRB bundling size, and a same precoding is used by PRBs belonging to a same PRB bundle, and the precoding is determined by the UE itself; and using the SRS and determining the PRB bundle as a channel estimation unit, to perform channel estimation.

In a third aspect, an embodiment of the present disclosure provide a UE, including: a first receiving module, used to receive indication information transmitted by a base station and used to indicate a PRB bundling size; and a transmitting module, used to transmit, within at least one PRB bundle, an SRS to the base station, wherein the number of PRBs included in the at least one PRB bundle is equal to the PRB bundling size, and a same precoding is used by PRBs belonging to a same PRB bundle, and the precoding is determined by the UE itself.

In a fourth aspect, an embodiment of the present disclosure provide a base station, including: a first transmitting module, used to transmit indication information used to indicate a PRB bundling size to a UE; a receiving module, used to receive, within at least one PRB bundle, the SRS transmitted by the UE, wherein the number of PRBs included in the at least one PRB bundle is equal to the PRB bundling size, and a same precoding is used by PRBs belonging to a same PRB bundle, and the precoding is determined by the UE itself; and an estimating module, used to use the SRS and determine the PRB bundle as a channel estimation unit, to perform channel estimation.

In a fifth aspect, an embodiment of the present disclosure provide a UE, including: a memory, a processor, and a computer program stored in the memory and capable of being executed by the processor, wherein the processor is used to execute the computer program to implement steps of the method for transmitting the SRS provided by the embodiments of the present disclosure.

In a sixth aspect, an embodiment of the present disclosure provide a base station, including: a memory, a processor, and a computer program stored in the memory and capable of being executed by the processor, wherein the processor is used to execute the computer program to implement steps of the method for receiving the SRS provided by the embodiments of the present disclosure.

In a seventh aspect, an embodiment of the present disclosure provides a computer-readable storage medium storing therein a computer program, wherein the computer program is executed by a processor, to implement steps of the method for transmitting the SRS provided by the embodiments of the present disclosure, or steps of the method for receiving the SRS provided by the embodiments of the present disclosure.

DETAILED DESCRIPTION

Technical solutions in the embodiments of the present disclosure will be clearly and completely described below in combination with the accompanying drawings in the embodiments of the present disclosure. Obviously, the following embodiments merely relate to a part of, rather than all of, the embodiments of the present disclosure, and based on these embodiments, those of ordinary skill in the art may, without any creative effort, obtain the other embodiments, which also fall within the scope of the present disclosure.

Figure 1:
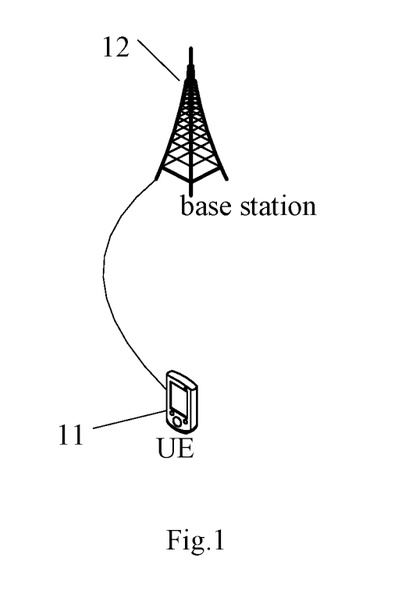
FIG. 1 is a structural diagram of a transmission system of an SRS according to an embodiment of the present disclosure.

Referring to FIG. 1, FIG. 1 is a structural diagram of a transmission system of an SRS according to an embodiment of the present disclosure. As shown in FIG. 1, a UE 11 and a base station 12 are included. The UE 11 may be, for example, a terminal side device, such as a mobile phone, a tablet personal computer, a laptop computer, a Personal Digital Assistant (PDA), a Mobile Internet Device (MID), or a wearable device, etc. It should be appreciated that a specific type of the UE 11 is not limited in the embodiments of the present disclosure. The above base station 12 may be a base station in a 5$^{th}$ Generation (5G) system, (for example, a gNB, a 5G New Radio Node B (NR NB)). It should be appreciated that a specific type of the base station 12 is not limited in the embodiments of the present disclosure.

It should be appreciated that specific functions of the above UE 11 and the base station 12 will be described in detail through the following embodiments.

Figure 2:
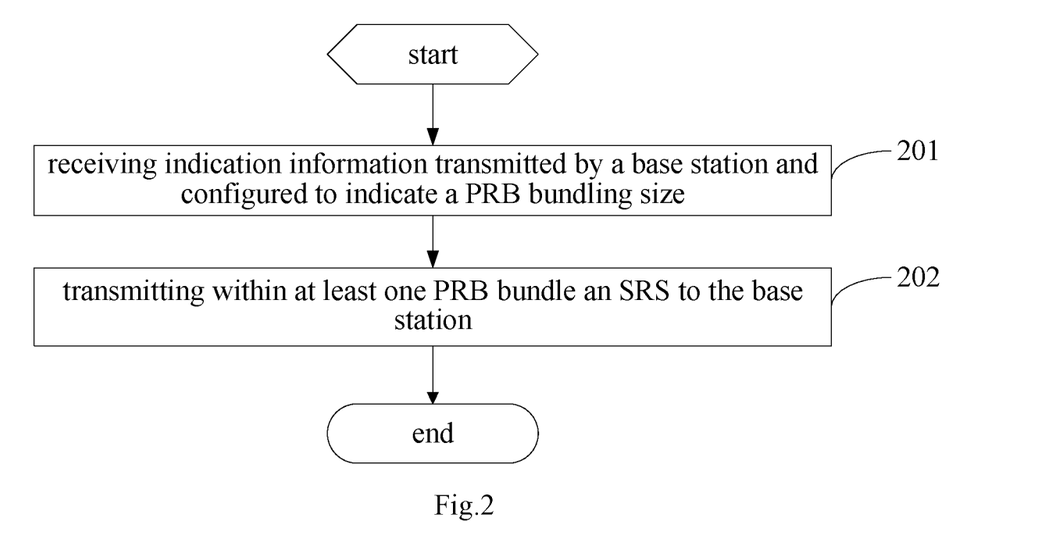
FIG. 2 is a schematic diagram of a method for transmitting the SRS according to an embodiment of the present disclosure.

Referring to FIG. 2, FIG. 2 is a schematic diagram of a method for transmitting the SRS according to an embodiment of the present disclosure. The method is applied to a UE. As shown in FIG. 2, the method includes the following steps.

Step 201: receiving indication information transmitted by the base station and used to indicate a PRB bundling size.

The above PRB bundling size can be considered as the number of PRBs included in a PRB bundle. For example, the above PRB bundling size may be 1, 2, 3, 5, or the like, that is, a PRB bundle may include 1, 2, 3 or 5 PRBs, or the like. Preferably, the above PRB bundling size is an integer greater than 1, thus performance of channel value estimation of the base station can be improved. The above PRB bundling size may be flexibly configured by the above base station for the above UE according to different scenarios, services, terminal specifics, or channel qualities, etc., which is not limited in the embodiments of the present disclosure.

Step 202: transmitting, within at least one PRB bundle, the SRS to the base station, wherein the number of PRBs included in the at least one PRB bundle is equal to the PRB bundling size, and a same precoding is used by PRBs belonging to a same PRB bundle, and the precoding is determined by the UE itself.

The above at least one PRB bundle may be obtained by binding (or dividing) PRBs used to transmit the SRS according to the above PRB bundling size. That is, the PRBs used to transmit the SRS may be bound into one or more PRB bundles, and the SRS is transmitted within the PRB bundles in step 202. The number of PRBs included in the at least one PRB bundle being equal to the PRB bundling size can be considered as, the number of PRBs included in part or all of the PRB bundles are equal to the PRB bundling size.

The same precoding being used by the PRBs belonging to the same PRB bundle can be considered as, the same precoding is used by the PRBs in any one of the PRB bundles. For example, a precoding 1 is used by all of PRBs within a PRB bundle 1 to transmit the SRS, a precoding 2 is used by all of PRBs within a PRB bundle 2 to transmit the SRS, and a precoding 3 is used by all of PRBs within a PRB bundle 3 to transmit the SRS. It should be appreciated that, this is just an example of different precodings used by different PRB bundles, but it is not limited thereto. For example, precodings used by different PRB bundles may be same, for example, the precoding 1 is used by all of the PRBs within the PRB bundle 1 to transmit the SRS, the precoding 2 is used by all of the PRBs within PRB bundle 2 to transmit the SRS, and the precoding 1 is used by all of the PRBs within a PRB bundle 3 to transmit the SRS.

The precoding being determined by the UE can be considered as, the precoding used in each PRB bundle is determined by the above UE. For example, the precoding may be selected from a precoding set stored by the UE, or selected from a precoding set preconfigured by a network side.

The precoding set stored by the above UE may be a precoding set stored by the UE in advance, for example, a precoding factory-configured by the UE and/or a precoding preconfigured by the network side for the UE, etc., which is not limited in the embodiments of the present disclosure.

Since the precoding is determined by the UE itself, an uplink transmission diversity scheme can be realized to be transparent. In addition, since the same precoding is used by the PRBs belonging to the same PRB bundle, when the channel is estimated by the base station, channel estimation can be performed by using the PRB bundle as a channel estimation unit, that is, the channel is estimated in a PRB bundle by PRB bundle manner. Therefore, the channel estimation is performed jointly by using the PRBs included in the PRB bundle, and it is not need to perform the channel estimation by using the PRB as the channel estimation unit, thereby improving performance of the network side channel estimation during SRS transmission.

It should be appreciated that the above method can be applied to a 5G system, but is not limited thereto, for example, it can also be applied to a future 6th-Generation (6G) system and the like.

In the embodiments of the present disclosure, receiving the indication information transmitted by the base station and used to indicate the PRB bundling size; and transmitting, within the at least one PRB bundle, the SRS to the base station, wherein the number of PRBs included in the at least one PRB bundle is equal to the PRB bundling size, and the same precoding is used by the PRBs belonging to the same PRB bundle, and the precoding is determined by the UE itself. Since the same precoding is used by the PRBs belonging to the same PRB bundle, the base station can use the PRB bundle as a unit to estimate the channel, thereby improving the performance of the channel estimation. Due to the precoding is determined by the UE itself, resource overhead indicating an SRS precoding can also be saved.

Figure 3:
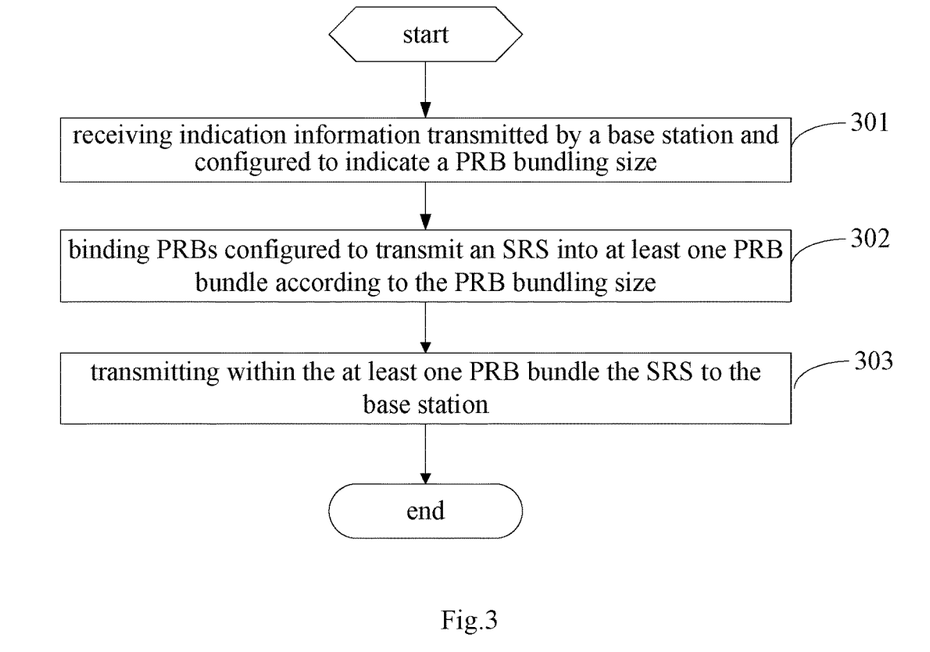
FIG. 3 is a schematic diagram of another method for transmitting the SRS according to an embodiment of the present disclosure.

Referring to FIG. 3, FIG. 3 is a schematic diagram of another method for transmitting the SRS according to an embodiment of the present disclosure. The method is applied to the UE. As shown in FIG. 3, the method includes the following steps.

Step 301: receiving the indication information transmitted by the base station and used to indicate the PRB bundling size.

The above indication information may be transmitted by the base station when the SRS is configured for the above UE. For example, receiving the indication information transmitted by the base station and used to indicate the PRB bundling size includes: receiving SRS configuration information transmitted by the base station, wherein the SRS configuration information includes transmission location information of the SRS and the indication information used to indicate the PRB bundling size.

The above transmission location information may indicate the PRBs used to transmit the SRS, or may indicate a transmission time domain location of the above SRS, and so on, which is not limited in the embodiments of the disclosure.

Signaling transmission overhead can be reduced by the above SRS configuration information, because the above indication information does not need to be transmitted through an additional signaling. It should be appreciated that, the above SRS configuration information may also include other information, for example, grid information or SRS block information, and so on.

Step 302: binding the PRBs used to transmit the SRS into the at least one PRB bundle according to the PRB bundling size; wherein the number of PRBs included in any one of the at least one PRB bundle is equal to the PRB bundling size; or the number of PRBs included in one of the at least one PRB bundle is smaller than the PRB bundling size, and the number of PRBs included in any one of the at least one PRB bundle other than the one PRB bundle is equal to the PRB bundling size.

The above PRBs used to transmit the SRS may be configured by the network side for the above UE, for example, 10 or 20 PRBs are configured. The number of PRBs included in any one of the at least one PRB bundle being equal to the PRB bundling size can be considered as, the number of PRBs included in each of the at least one PRB bundle is same. For example, the number of PRBs used to transmit the SRS can be divided by the above PRB bundling size with no remainder, for example, when the number of PRBs used to transmit the SRS is 20, and the above PRB bundling size is 4, the number of PRBs included in each of the at least one PRB bundle is 4.

The number of PRBs included in one of the at least one PRB bundle being smaller than the PRB bundling size, and the number of PRBs included in any one of the at least one PRB bundle other than the one PRB bundle being equal to the PRB bundling size can be considered as, when the at least one PRB bundle is a plurality of PRB bundle, the PRB s used to transmit the SRS cannot be divided by the PRB bundling size with no remainder. For example, when the number of PRBs used to transmit the SRS is 10, and the above PRB bundling size is 3, the number of PRBs included in each of 3 PRB bundles is 3, the number of PRBs included in another PRB bundle is 1. That is, when the PRBs used to transmit the SRS cannot be divided by the PRB bundling size with no remainder, the UE automatically reduces a PRB bundling size of a last PRB bundle including a remainder, so that its PRB bundling size is equal to the remainder.

As an optional implementation, before binding the PRBs used to transmit the SRS into the at least one PRB bundle according to the PRB bundling size, the method further includes: receiving grid information configured by the base station, wherein binding the PRBs used to transmit the SRS into the at least one PRB bundle according to the PRB bundling size includes: dividing the PRBs used to transmit the SRS into at least two SRS regions according to the grid information, and binding each of the at least two SRS regions into at least one respective PRB bundle according to the PRB bundling size.

Figure 4:
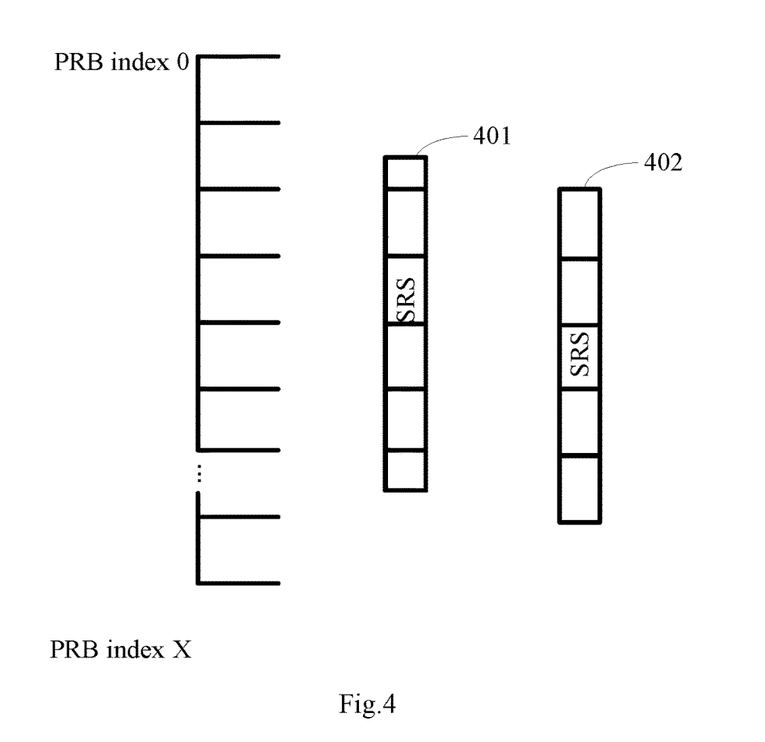
FIG. 4 is a schematic diagram of PRB network segmentation according to an embodiment of the present disclosure.

The above grid information may be considered as information that divides PRB resource into a plurality of regions, and the grid information may include a regional interval. For example, as shown in FIG. 4, a PRB index 0 to a PRB index X are divided into a plurality of SRS regions, and a size of each of the plurality of SRS regions is the above regional interval. For example, the PRBs used to transmit the SRS is shown by a reference 401 in FIG. 4, then the PRBs used to transmit the SRS are divided into six SRS regions in this embodiment, wherein first and last SRS regions occupy only a part of the regional interval. For another example, the PRBs used to transmit the SRS are shown by a reference 402 in FIG. 4, then the PRBs used to transmit the SRS are divided into five SRS regions in this embodiment, and size of each of the five SRS regions is equal to the regional interval.

In addition, when the PRBs are divided into the plurality of SRS regions, each of divided SRS regions is independently used as a PRB bundle. Similarly, in a case where the number of the divided SRS regions cannot be divided by the PRB bundling size with no remainder, the UE automatically reduces a PRB bundling size of a last PRB bundle including a remainder, so that its PRB bundling size is equal to the remainder. For example, when the divided SRS region includes 5 PRBs and a network indicates that the PRB bundling size is equal to 2, the UE configures the 5 PRBs of the divided SRS region as PRB bundles with 2 PRBs, 2 PRBs, and 1 PRB, respectively, wherein a size of the PRB bundle with the 1 PRB is equal to the remainder (5/2).

It should be appreciated that, in this embodiment, the above PRB bundling size may be less than or equal to the regional interval.

In this embodiment, the above grid information can be used to divide the SRS regions for different UEs, and the above grid information does not need to be transmitted to the UE each time the SRS is configured, thereby saving signaling transmission overhead. In addition, each of the SRS regions is separately used as a PRB bundle, so that accuracy of the PRB bundle can be improved to improve performance of the SRS transmission. Moreover, it can also realize that most of the PRB bundles used to transmit the SRS of different UEs are aligned, thereby reducing interference between multi-UEs and improving transmission performance of the SRS.

In another optional embodiment, before binding the PRBs used to transmit the SRS into the at least one PRB bundle according to the PRB bundling size, the method further includes: receiving SRS block information configured by the base station, wherein binding the PRBs used to transmit the SRS into the at least one PRB bundle according to the PRB bundling size includes: dividing the PRBs used to transmit the SRS into at least two SRS blocks according to the SRS block information, and binding each of the at least two SRS blocks into at least one respective PRB bundle according to the PRB bundling size.

The SRS block information is used to indicate that the PRBs used to transmit the SRS is divided into the at least two SRS blocks, and the SRS block information may include the number of PRBs included in each of the at least two SRS blocks, or a division rule for the at least two SRS blocks, etc., which is not limited in the embodiments of the disclosure. In addition, the SRS block division can support nonuniform allocation. For example, when the number of PRBs used to transmit the SRS is 10, the PRBs can be divided into SRS blocks with 3 PRBs, 4 PRBs, and 3 PRBs, respectively; alternatively, the PRBs can be divided into two SRS blocks each with 5 PRBs.

It should be appreciated that, in this embodiment, the above PRB bundling size may be less than or equal to the number of the at least two SRS blocks.

In this embodiment, each of the at least two SRS blocks is separately used as a PRB bundle, so that the accuracy of the PRB bundle can be improved to improve the performance of the SRS transmission. Since the at least two SRS blocks are first divided and then bound into the PRB bundles, it can realize that most of the PRB bundles used to transmit the SRS of different UEs are aligned, thereby reducing the interference between the multi-UEs and improving the transmission performance of the SRS.

Step 303: transmitting, within the at least one PRB bundle, the SRS to the base station, wherein the same precoding is used by the PRBs belonging to the same PRB bundle, and the precoding is determined by the UE itself.

In this embodiment, the network side can simultaneously indicate the PRB bundling size when the SRS of the UE is configured by the network side through the above steps, so that this can solve a situation that the UE determines the precoding on its own, that is, a situation that the network side cannot obtain information, and the performance of the channel estimation is improved.

Figure 5:
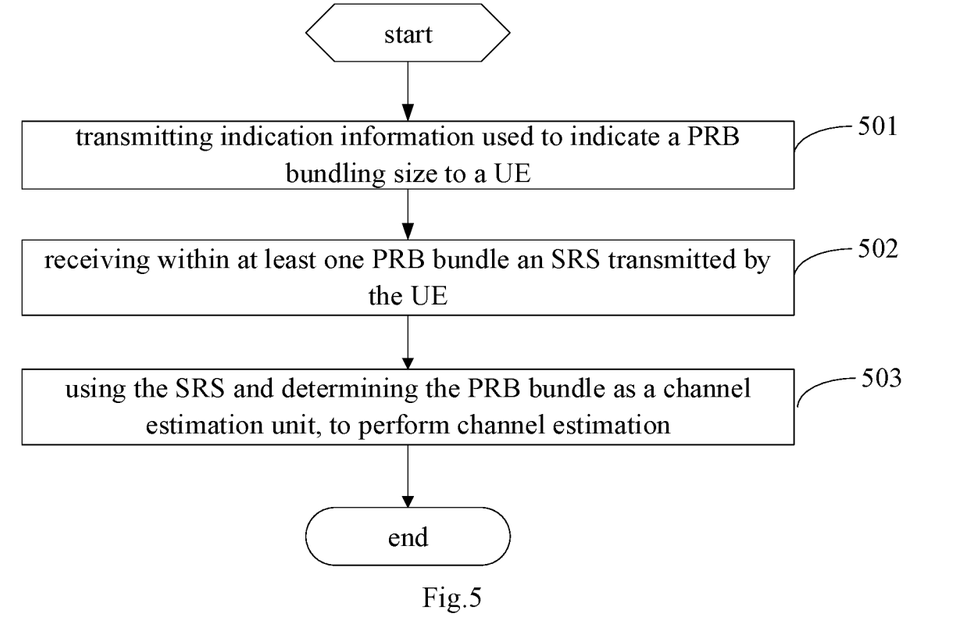
FIG. 5 is a schematic diagram of a method for receiving the SRS according to an embodiment of the present disclosure.

Referring to FIG. 5, FIG. 5 is a flowchart of a method for receiving an SRS according to an embodiment of the present disclosure. The method is applied to a base station. As shown in FIG. 5, the method includes the following steps: step 501: transmitting indication information used to indicate a PRB bundling size to a UE; step 502: receiving, within at least one PRB bundle, the SRS transmitted by the UE, wherein the number of PRBs included in the at least one PRB bundle is equal to the PRB bundling size, and a same precoding is used by PRBs belonging to a same PRB bundle, and the precoding is determined by the UE itself; and step 503: using the SRS and determining the PRB bundle as a channel estimation unit, to perform channel estimation.

Optionally, the precoding is selected from a precoding set stored by the UE, or selected from a precoding set preconfigured by a network side.

Optionally, before receiving within the at least one PRB bundle the SRS transmitted by the UE, the method includes: transmitting grid information to the UE, wherein the grid information is used to enable the UE to divide the PRBs used to transmit the SRS into at least two SRS regions according to the grid information, and bind each of the at least two SRS regions into at least one respective PRB bundle according to the PRB bundling size.

Optionally, before receiving within the at least one PRB bundle the SRS transmitted by the UE, the method further includes: transmitting SRS block information to the UE, wherein the SRS block information is used to enable the UE to divide the PRBs used to transmit the SRS into at least two SRS blocks according to the SRS block information, and bind each of the at least two SRS blocks into at least one respective PRB bundle according to the PRB bundling size.

Optionally, transmitting the indication information used to indicate the PRB bundling size to the UE includes: transmitting SRS configuration information to the UE, wherein the SRS configuration information includes transmission location information of the SRS and the indication information used to indicate the PRB bundling size.

It should be appreciated that this embodiment is used as an implementation of the base station corresponding to the embodiment shown in FIG. 2 to FIG. 3, and a specific implementation thereof can refer to related descriptions of the embodiment shown in FIG. 2 to FIG. 3 and same beneficial effects can be achieved. In order to avoid repeated explanation, it will not be repeated herein.

Figure 6:
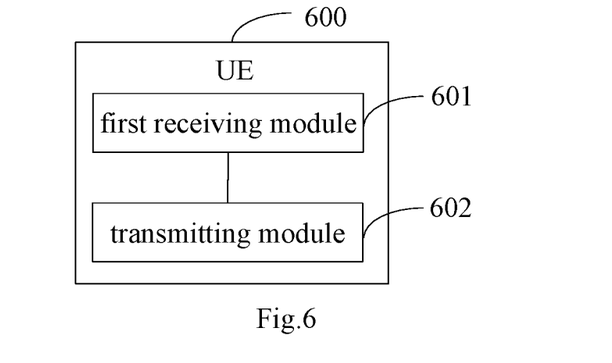
FIG. 6 is a structural diagram of a UE according to an embodiment of the present disclosure.

Referring to FIG. 6, FIG. 6 is a structural diagram of a UE according to an embodiment of the present disclosure. As shown in FIG. 6, the UE 600 includes: a first receiving module 601, used to receive indication information transmitted by a base station and used to indicate a PRB bundling size; and a transmitting module 602, used to transmit, within at least one PRB bundle, an SRS to the base station, wherein the number of PRBs included in the at least one PRB bundle is equal to the PRB bundling size, and a same precoding is used by PRBs belonging to a same PRB bundle, and the precoding is determined by the UE itself.

Optionally, the precoding is selected from a precoding set stored by the UE, or selected from a precoding set preconfigured by a network side.

Figure 7:
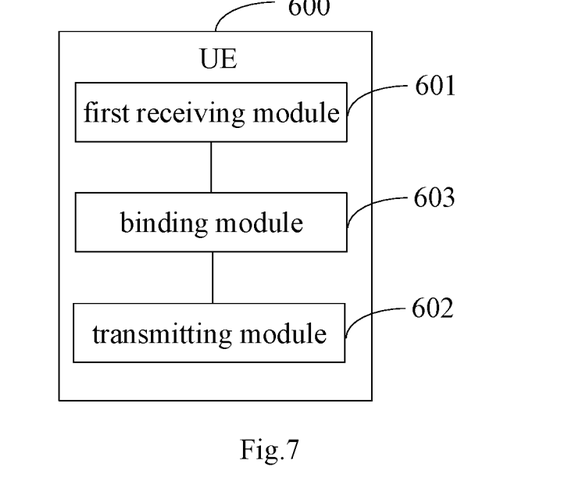
FIG. 7 is a structural diagram of another UE according to an embodiment of the present disclosure.

Optionally, as shown in FIG. 7, the UE 600 further includes: a binding module 603, used to bind the PRBs used to transmit the SRS into the at least one PRB bundle according to the PRB bundling size; wherein the number of PRBs included in any one of the at least one PRB bundle is equal to the PRB bundling size; or the number of PRBs included in one of the at least one PRB bundle is smaller than the PRB bundling size, and the number of PRBs included in any one of the at least one PRB bundle other than the one PRB bundle is equal to the PRB bundling size.

Figure 8:
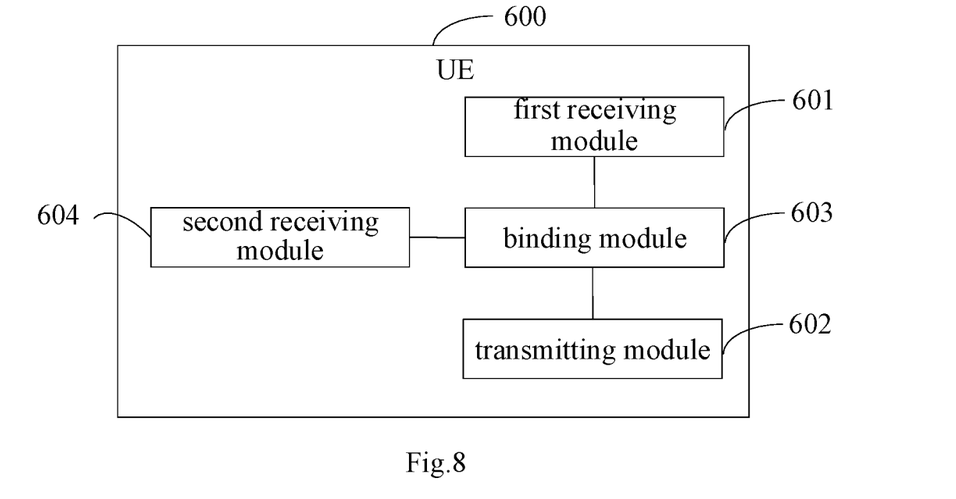
FIG. 8 is a structural diagram of another UE according to an embodiment of the present disclosure.

Optionally, as shown in FIG. 8, the UE 600 further includes: a second receiving module 604, used to receive grid information configured by the base station; wherein the binding module 603 is used to divide the PRBs used to transmit the SRS into at least two SRS regions according to the grid information, and bind each of the at least two SRS regions into at least one respective PRB bundle according to the PRB bundling size.

Figure 9:
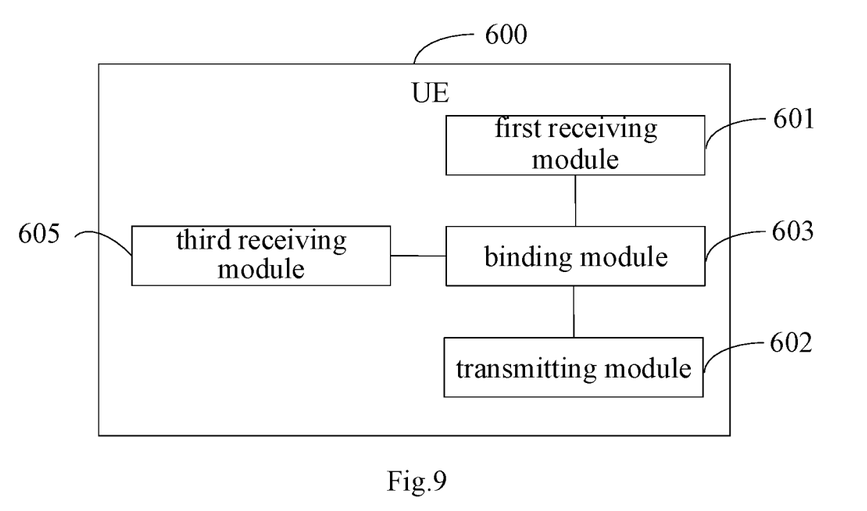
FIG. 9 is a structural diagram of another UE according to an embodiment of the present disclosure.

Optionally, as shown in FIG. 9, the UE 600 further includes: a third receiving module 605, used to receive SRS block information configured by the base station; wherein the binding module 603 is used to divide the PRBs used to transmit the SRS into at least two SRS blocks according to the SRS block information, and divide each of the at least two SRS blocks into at least one respective PRB bundle according to the PRB bundling size.

Optionally, the first receiving module 601 is used to receive SRS configuration information transmitted by the base station, wherein the SRS configuration information includes transmission location information of the SRS and the indication information used to indicate the PRB bundling size.

It should be appreciated that, in this embodiment, the above UE 600 may be a UE in any implementation in the method embodiments of the disclosure, and any implementation of the UE in the method embodiments of the disclosure can be implemented by the above UE 600 in this embodiment, and achieves same beneficial effects, which will not be repeated herein.

Figure 10:
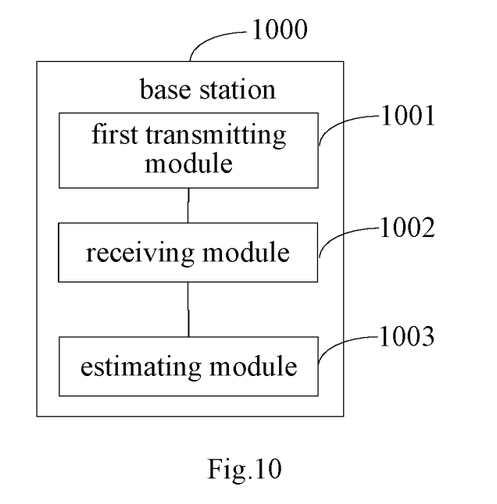
FIG. 10 is a structural diagram of a base station according to an embodiment of the present disclosure.

Referring to FIG. 10, FIG. 10 is a structural diagram of a base station according to an embodiment of the present disclosure. As shown in FIG. 10, the base station 1000 includes: a first transmitting module 1001, used to transmit indication information used to indicate a PRB bundling size to a UE; a receiving module 1002, used to receive, within at least one PRB bundle, the SRS transmitted by the UE, wherein the number of PRBs included in the at least one PRB bundle is equal to the PRB bundling size, and a same precoding is used by PRBs belonging to a same PRB bundle, and the precoding is determined by the UE itself; and an estimating module 1003, used to use the SRS and determine the PRB bundle as a channel estimation unit, to perform channel estimation.

Optionally, the precoding is selected from a precoding set stored by the UE, or selected from a precoding set preconfigured by a network side.

Figure 11:
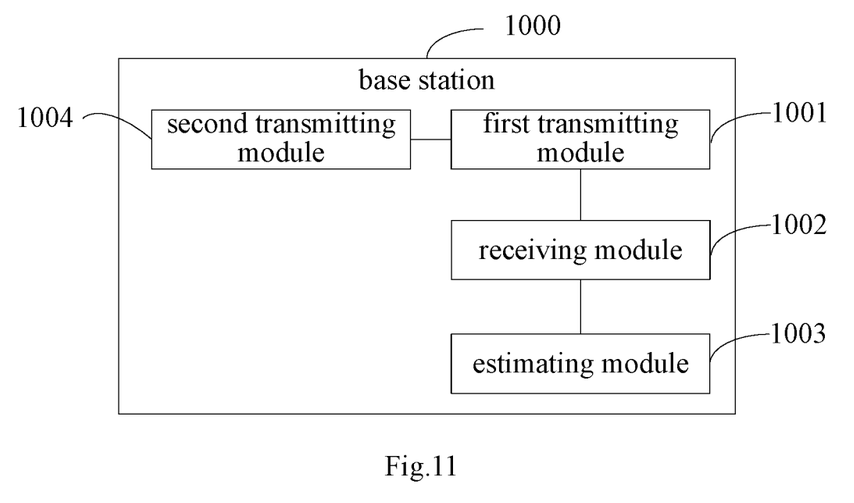
FIG. 11 is a structural diagram of another base station according to an embodiment of the present disclosure.

Optionally, as shown in FIG. 11, the base station 1000 includes: a second transmitting module 1004, used to transmit grid information to the UE, wherein the grid information is used to enable the UE to divide the PRBs used to transmit the SRS into at least two SRS regions according to the grid information, and bind each of the at least two SRS regions into at least one respective PRB bundle according to the PRB bundling size.

Figure 12:
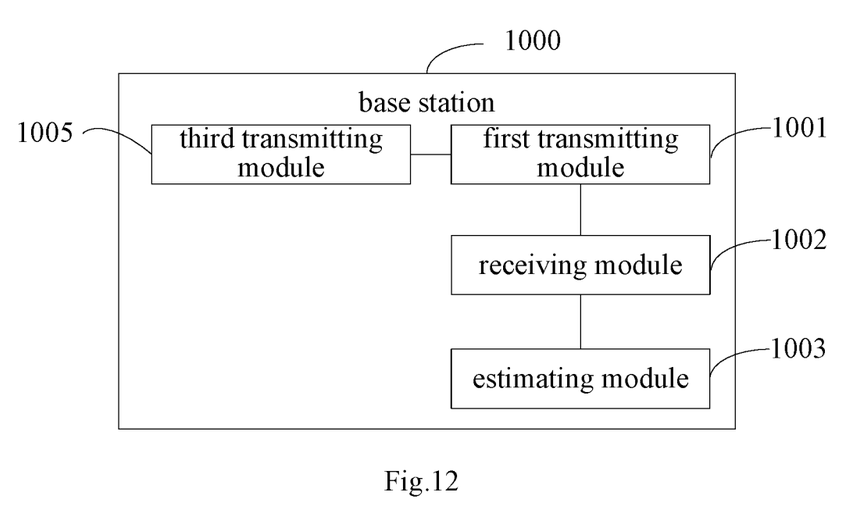
FIG. 12 is a structural diagram of another base station according to an embodiment of the present disclosure.

Optionally, as shown in FIG. 12, the base station 1000 includes: a third transmitting module 1005, used to transmit SRS block information to the UE, wherein the SRS block information is used to enable the UE to divide the PRBs used to transmit the SRS into at least two SRS blocks according to the SRS block information, and bind each of the at least two SRS blocks into at least one respective PRB bundle according to the PRB bundling size.

Optionally, the first transmitting module 1001 is used to transmit SRS configuration information to the UE, wherein the SRS configuration information includes transmission location information of the SRS and the indication information used to indicate the PRB bundling size.

It should be appreciated that, in this embodiment, the above base station 1000 may be a base station in any implementation in the method embodiments of the present disclosure, and any implementation of the base station in the method embodiments of the present disclosure can be implemented by the above base station 1000 in this embodiment, and achieves the same beneficial effects, which will not be repeated herein.

Figure 13:
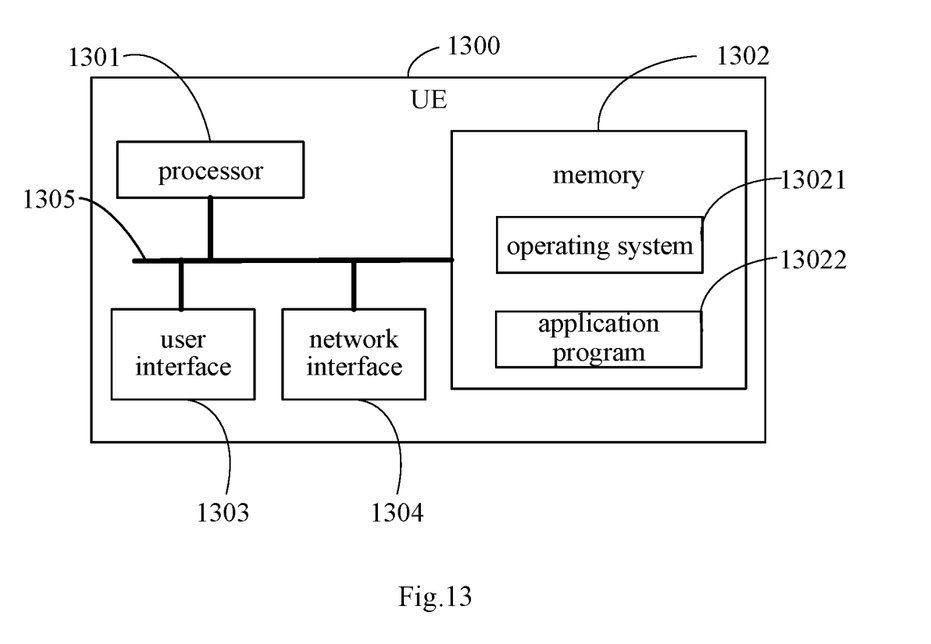
FIG. 13 is a structural diagram of another UE according to an embodiment of the present disclosure.

Referring to FIG. 13, FIG. 13 is a structural diagram of another UE according to an embodiment of the present disclosure. As shown in FIG. 13, the UE 1300 includes: at least one processor 1301, a memory 1302, at least one network interface 1304, and a user interface 1303. Various components in UE 1300 are coupled together by a bus system 1305. It should be appreciated that the bus system 1305 is used to implement connection communication between these components. In addition to a data bus, the bus system 1305 includes a power bus, a control bus, and a status signal bus. However, for clarity of description, various buses are labeled as the bus system 1305 in FIG. 13.

The user interface 1303 may include a display, a keyboard, or a pointing device (e.g., a mouse, a track ball, a touch pad, or a touch screen, etc.).

It should be appreciated that the memory 1302 in the embodiments of the present disclosure may be a volatile memory or a non-volatile memory, or may include both volatile and non-volatile memories. The non-volatile memory may be a Read-Only memory (ROM), a Programmable Read-Only Memory (PROM), an Erasable Programmable Read Only Memory (Erasable PROM, EPROM), or an Electric Erase Programmable Read Only Memory (EEPROM) or flash memory. The volatile memory can be a Random Access Memory (RAM) that acts as an external cache. By way of example and not limitation, many forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), Synch Link Dynamic Random Access Memory (SLDRAM) and Direct Rambus Random Access Memory (DRRAM). The memory 1302 of the systems and methods described herein is intended to include, without being limited to, these and any other suitable types of memory.

In some implementations, the memory 1302 stores following elements: executable modules or data structures, or a subset thereof, or an extended set thereof: an operating system 13021 and an application program 13022.

The operating system 13021 includes various system programs, such as a framework layer, a core library layer and a driver layer, for implementing various basic services and processing hardware-based tasks. The application program 13022 includes various application programs, such as a Media Player, a Browser, for implementing various application services. A program implementing the method of the embodiments of the present disclosure may be included in the application program 13022.

In the embodiments of the present disclosure, the UE 1300 further includes a computer program stored in the memory 1302 and capable of being executed by the processor 1301. Specifically, it may be a computer program stored in the application program 13022, and the processor 1301 is used to execute the computer program to implement following steps: receiving indication information transmitted by a base station and used to indicate a PRB bundling size; and transmitting, within at least one PRB bundle, the SRS to the base station, wherein the number of PRBs included in the at least one PRB bundle is equal to the PRB bundling size, and a same precoding is used by PRBs belonging to a same PRB bundle, and the precoding is determined by the UE itself.

The method disclosed in the above embodiments of the present disclosure may be applied to the processor 1301 or implemented by the processor 1301. The processor 1301 may be an integrated circuit chip with signal processing capabilities. In an implementation process, each step of the above method may be completed by an integrated logic circuit of hardware in the processor 1301 or an instruction in a form of software. The processor 1301 may be a general-purpose processor, a Digital Signal Processor (DSP), an Application Specific Integrated Circuit (ASIC), a Field Programmable Gate Array (FPGA), or other programmable logic devices, discrete gates or transistor logic devices, and discrete hardware components. Various methods, steps, and logical block diagrams disclosed in the embodiments of the present disclosure may be implemented or executed. The general-purpose processor may be a microprocessor, or the processor may be any conventional processor or the like. The steps of the method disclosed in combination with the embodiments of the present disclosure may be directly embodied as being executed by a hardware decoding processor, or being executed by a combination of hardware and software modules in a decoding processor. The software module can be located in a well-established storage medium in the art, such as random access memory, flash memory, read-only memory, programmable read-only memory or electrically erasable programmable memory, registers, and the like. The storage medium is located in the memory 1302, and the processor 1301 reads information in the memory 1302 and completes the steps of the above method in combination with its hardware.

It should be appreciated that the embodiments described herein can be implemented by hardware, software, firmware, middleware, microcode, or a combination thereof. For hardware implementation, the processing unit can be implemented in one or more ASICs, DSPs, Digital Signal Processing Devices (DSPDs), Programmable Logic Devices (PLDs), FPGAs, general purpose processors, controllers, microcontrollers, microprocessors, other electronic units for performing functions described in the present application or a combination thereof.

For software implementation, techniques described herein may be implemented by modules (such as procedures, functions) that perform the functions described herein. Software codes can be stored in a memory and executed by a processor. The memory can be implemented in the processor or external to the processor.

Optionally, the precoding is selected from a precoding set stored by the UE, or selected from a precoding set preconfigured by a network side.

Optionally, before transmitting within the at least one PRB bundle the SRS to the base station, the processor 1301 is used to execute the computer program, to further implement following steps: binding the PRBs used to transmit the SRS into the at least one PRB bundle according to the PRB bundling size; wherein the number of PRBs included in any one of the at least one PRB bundle is equal to the PRB bundling size; or the number of PRBs included in one of the at least one PRB bundle is smaller than the PRB bundling size, and the number of PRBs included in any one of the at least one PRB bundle other than the one PRB bundle is equal to the PRB bundling size.

Optionally, before binding the PRBs used to transmit the SRS into the at least one PRB bundle according to the PRB bundling size, the processor 1301 is used to execute the computer program, to further implement following steps: receiving grid information configured by the base station, wherein binding the PRBs used to transmit the SRS into the at least one PRB bundle according to the PRB bundling size executed by the processor 1301 includes: dividing the PRBs used to transmit the SRS into at least two SRS regions according to the grid information, and binding each of the at least two SRS regions into at least one respective PRB bundle according to the PRB bundling size.

Optionally, before binding the PRBs used to transmit the SRS into the at least one PRB bundle according to the PRB bundling size, the processor 1301 is used to execute the computer program, to further implement following steps: receiving SRS block information configured by the base station, wherein binding the PRBs used to transmit the SRS into the at least one PRB bundle according to the PRB bundling size executed by the processor 1301 includes: dividing the PRBs used to transmit the SRS into at least two SRS blocks according to the SRS block information, and binding each of the at least two SRS blocks into at least one respective PRB bundle according to the PRB bundling size.

Optionally, receiving the indication information transmitted by the base station and used to indicate the PRB bundling size executed by the processor 1301 includes: receiving SRS configuration information transmitted by the base station, wherein the SRS configuration information includes transmission location information of the SRS and the indication information used to indicate the PRB bundling size.

It should be appreciated that, in this embodiment, the above UE 1300 may be a UE in any implementation in the method embodiments of the present disclosure, and any implementation of the UE in the method embodiments of the present disclosure can be implemented by the above UE 1300 in this embodiment, and achieves the same beneficial effects, which will not be repeated herein.

Figure 14:
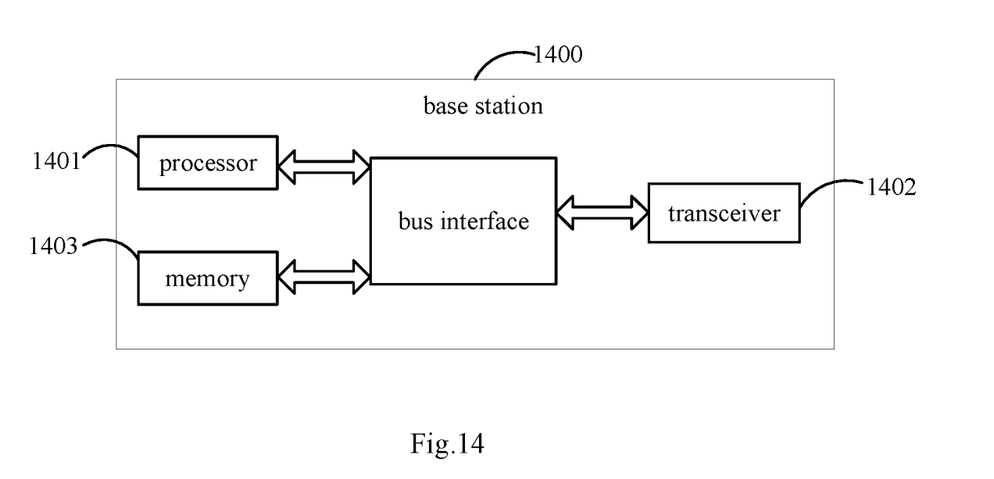
FIG. 14 is a structural diagram of another base station according to an embodiment of the present disclosure.

Referring to FIG. 14, FIG. 14 is a structural diagram of another base station according to an embodiment of the present disclosure. As shown in FIG. 14, the base station 1400 includes: a processor 1401, a transceiver 1402, a memory 1403, and a bus interface.

In the embodiments of the present disclosure, the base station 1400 further includes: a computer program stored in the memory 1403 and capable of being executed by the processor 1401, and the processor 1401 is used to execute the computer program to implement following steps: transmitting indication information used to indicate a PRB bundling size to a UE; receiving, within at least one PRB bundle, the SRS transmitted by the UE, wherein the number of PRBs included in the at least one PRB bundle is equal to the PRB bundling size, and a same precoding is used by PRBs belonging to a same PRB bundle, and the precoding is determined by the UE itself; and using the SRS and determining the PRB bundle as a channel estimation unit, to perform channel estimation.

The transceiver 1402 is used to receive and transmit data under control of the processor 1401, and the transceiver 1402 includes at least two antenna ports.

In FIG. 14, a bus architecture may include any number of buses and bridges connected to each other, so as to connect various circuits for one or more processors such as the processor 1400 and one or more memories such as the processor 1403. In addition, the bus architecture may be used to connect various other circuits, such as a circuit for a peripheral device, a circuit for a voltage stabilizer and a power management circuit, which are known in the art and will not be further described herein. The bus interface may be provided, and the transceiver 1402 may consist of a plurality of elements, i.e., a transmitter and a receiver for communication with various other devices over a transmission medium. With respect to different UEs, the user interface 1404 may also be provided for devices which are to be arranged inside or outside the UE, and these devices may include but not limited to a keypad, a display, a speaker, a microphone and a joystick.

The processor 1401 may take charge of managing the bus architecture as well general processings, and the memory 1403 may store data therein for operation of the processor 1401.

Optionally, the precoding is selected from a precoding set stored by the UE, or selected from a precoding set preconfigured by a network side.

Optionally, before receiving within the at least one PRB bundle the SRS transmitted by the UE, the processor 1401 is used to execute the computer program, to further implement following steps: transmitting grid information to the UE, wherein the grid information is used to enable the UE to divide the PRBs used to transmit the SRS into at least two SRS regions according to the grid information, and bind each of the at least two SRS regions into at least one respective PRB bundle according to the PRB bundling size.

Optionally, before receiving within the at least one PRB bundle the SRS transmitted by the UE, the processor 1401 is used to execute the computer program, to further implement following steps: transmitting SRS block information to the UE, wherein the SRS block information is used to enable the UE to divide the PRBs used to transmit the SRS into at least two SRS blocks according to the SRS block information, and bind each of the at least two SRS blocks into at least one respective PRB bundle according to the PRB bundling size.

Optionally, transmitting the indication information used to indicate the PRB bundling size to the UE executed by the processor 1401 includes: transmitting SRS configuration information to the UE, wherein the SRS configuration information includes transmission location information of the SRS and the indication information used to indicate the PRB bundling size.

It should be appreciated that, in this embodiment, the above base station 1400 may be a base station in any implementation in the method embodiments of the present disclosure, and any implementation of the base station in the method embodiments of the present disclosure can be implemented by the above base station 1400 in this embodiment, and achieves the same beneficial effects, which will not be repeated herein.

The embodiments of the present disclosure further provide a UE including: a memory, a processor, and a computer program stored in the memory and capable of being executed by the processor, wherein the processor is used to execute the computer program to implement steps of the method for transmitting the SRS provided by the embodiments of the present disclosure.

The embodiments of the present disclosure further provide a base station including: a memory, a processor, and a computer program stored in the memory and capable of being executed by the processor, wherein the processor is used to execute the computer program to implement steps of the method for receiving the SRS provided by the embodiments of the present disclosure.

The embodiments of the present disclosure further provides a computer-readable storage medium storing therein a computer program, wherein the computer program is executed by a processor, to implement steps of the method for transmitting the SRS provided by the embodiments of the present disclosure, or steps of the method for receiving the SRS provided by the embodiments of the present disclosure.

Those of ordinary skill in the art may realize that units and algorithm steps of each example described in combination with the embodiments disclosed herein may be implemented in electronic hardware or a combination of computer software and electronic hardware. Whether these functions are performed in hardware or software depends on specific applications and design constraints of the technical solution. A professional technician can use different methods to implement described functions for each specific application, but such implementation should not be considered beyond the scope of the present disclosure.

Those of ordinary skill in the art may clearly understand that, for convenience and brevity of the description, specific working process of the system, the device and the unit described above may refer to the corresponding process in the above method embodiments, which will not be repeated herein.

In the embodiments provided by the present application, it should be appreciated that the disclosed device and method may be implemented in other manners. For example, the device embodiments described above are merely illustrative. For example, division of the units is merely a logical function division. In actual implementations, there may be another division manner. For example, multiple units or components may be combined, or may be integrated into another system, or some features may be ignored or not executed. In addition, coupling or direct coupling or communication connection between the components shown or discussed may be indirect coupling or a communication connection through some interfaces, devices or units, and may be electrical, mechanical or other forms.

The units described as separate components may or may not be physically separated, and the components displayed as the units may or may not be physical units, that is, they may be located in one place or distributed to multiple network units. Some or all of the units may be selected according to actual needs to achieve objectives of the present disclosure.

In addition, different functional units in different embodiments of the present disclosure may be integrated into one processing unit, or may physically exist separately, or two or more units may be integrated into one unit.

When the functions are implemented in a form of software functional units and sold or used as independent products, they may be stored in a computer-readable storage medium. Based on this understanding, the technical solution of the present disclosure essentially, or a part that contributes to the related art, or a part of the technical solution may be embodied in a form of a software product. The computer software product is stored in a storage medium and includes instructions for causing a computer device (for example, a personal computer, a server, or a network device) to perform all or part of the steps of the method described in various embodiments of the present disclosure. The above storage medium includes various media that can store program codes, such as a Universal Serial Bus (USB) flash disk, a mobile hard disk, a ROM, a RAM, a magnetic disk, or an optical disk, and the like.

The above content is only the specific embodiments of the present disclosure, but the scope of the present disclosure is not limited thereto. Any changes or substitutions easily conceived by those of ordinary skill in the art in the technical scope of the disclosure should fall within the protection scope of the disclosure. Therefore, the protection scope of the present disclosure should be determined by the scope of the appended claims.

What is claimed is:

1. A method for transmitting a Sounding Reference Signal (SRS), wherein the method is used to be applied to a User Equipment (UE) and comprises:
   receiving indication information transmitted by a base station and used to indicate a Physical Resource Block (PRB) bundling size; and
   transmitting, within at least one PRB bundle, the SRS to the base station, wherein the number of PRBs comprised in part or all of the at least one PRB bundle is equal to the PRB bundling size, and a same precoding is used by PRBs belonging to a same PRB bundle, and the precoding is determined by the UE itself;
   wherein before transmitting within the at least one PRB bundle the SRS to the base station, the method further comprises:
   binding the PRBs used to transmit the SRS into the at least one PRB bundle according to the PRB bundling size;
   wherein the number of PRBs comprised in any one of the at least one PRB bundle is equal to the PRB bundling size; or
   the number of PRBs comprised in one of the at least one PRB bundle is smaller than the PRB bundling size, and of the number of PRBs comprised in any one of the at least one PRB bundle other than the one PRB bundle is equal to the PRB bundling size;
   wherein before binding the PRBs used to transmit the SRS into the at least one PRB bundle according to the PRB bundling size, the method further comprises:
   receiving grid information configured by the base station, wherein binding the PRBs used to transmit the SRS into the at least one PRB bundle according to the PRB bundling size comprises:
   dividing the PRBs used to transmit the SRS into at least two SRS regions according to the grid information, and binding each of the at least two SRS regions into at least one respective PRB bundle according to the PRB bundling size;
or,
wherein before binding the PRBs used to transmit the SRS into the at least one PRB bundle according to the PRB bundling size, the method further comprises:
   receiving SRS block information configured by the base station,
   wherein binding the PRBs used to transmit the SRS into the at least one PRB bundle according to the PRB bundling size comprises:
   dividing the PRBs used to transmit the SRS into at least two SRS blocks according to the SRS block information, and binding each of the at least two SRS blocks into at least one respective PRB bundle according to the PRB bundling size.

2. The method according to claim 1, wherein the precoding is selected from a precoding set stored by the UE, or selected from a precoding set preconfigured by a network side.

3. The method according to claim 1, wherein receiving the indication information transmitted by the base station and used to indicate the PRB bundling size comprises:
   receiving SRS configuration information transmitted by the base station, wherein the SRS configuration information comprises transmission location information of the SRS and the indication information used to indicate the PRB bundling size.

4. A method for receiving an SRS, wherein the method is used to be applied to a base station and comprises:
   transmitting indication information used to indicate a PRB bundling size to a UE;
   receiving, within at least one PRB bundle, the SRS transmitted by the UE, wherein the number of PRBs comprised in part or all of the at least one PRB bundle is equal to the PRB bundling size, and a same precoding is used by PRBs belonging to a same PRB bundle, and the precoding is determined by the UE itself; and
   using the SRS and determining the PRB bundle as a channel estimation unit, to perform channel estimation;
   wherein before receiving within the at least one PRB bundle the SRS transmitted by the UE, the method further comprises:
   transmitting grid information to the UE, wherein the grid information is used to enable the UE to divide the PRBs used to transmit the SRS into at least two SRS regions according to the grid information, and bind each of the at least two SRS regions into at least one respective PRB bundle according to the PRB bundling size;
or,
wherein before receiving within the at least one PRB bundle the SRS transmitted by the UE, the method further comprises:
   transmitting SRS block information to the UE, wherein the SRS block information is used to enable the UE to divide the PRBs used to transmit the SRS into at least two SRS blocks according to the SRS block information, and bind each of the at least two SRS blocks into at least one respective PRB bundle according to the PRB bundling size.

5. The method according to claim 4, wherein the precoding is selected from a precoding set stored by the UE, or selected from a precoding set preconfigured by a network side.

6. The method according to claim 4, wherein transmitting the indication information used to indicate the PRB bundling size to the UE comprises:
   transmitting SRS configuration information to the UE, wherein the SRS configuration information comprises transmission location information of the SRS and the indication information used to indicate the PRB bundling size.

7. A base station comprising: a memory, a processor, and a computer program stored in the memory and capable of being executed by the processor, wherein the processor is used to execute the computer program to implement steps of the method for receiving the SRS according to claim 4.

8. The base station according to claim 7, wherein the precoding is selected from a precoding set stored by the UE, or selected from a precoding set preconfigured by a network side.

9. A UE comprising: a memory, a processor, and a computer program stored in the memory and capable of being executed by the processor, wherein the processor is used to execute the computer program to:
   receive indication information transmitted by a base station and used to indicate a PRB bundling size; and
   transmit, within at least one PRB bundle, the SRS to the base station, wherein the number of PRBs comprised in part or all of the at least one PRB bundle is equal to the PRB bundling size, and a same precoding is used by PRBs belonging to a same PRB bundle, and the precoding is determined by the UE itself;
   wherein the processor is further used to execute the computer program to: before transmitting within the at least one PRB bundle the SRS to the base station,
   bind the PRBs used to transmit the SRS into the at least one PRB bundle according to the PRB bundling size;
   wherein the number of PRBs comprised in any one of the at least one PRB bundle is equal to the PRB bundling size; or
   the number of PRBs comprised in one of the at least one PRB bundle is smaller than the PRB bundling size, and of the number of PRBs comprised in any one of the at least one PRB bundle other than the one PRB bundle is equal to the PRB bundling size;
   wherein the processor is further used to execute the computer program to: before binding the PRBs used to transmit the SRS into the at least one PRB bundle according to the PRB bundling size,
   receive grid information configured by the base station,
   wherein the processor is further used to execute the computer program to:
   divide the PRBs used to transmit the SRS into at least two SRS regions according to the grid information, and bind each of the at least two SRS regions into at least one respective PRB bundle according to the PRB bundling size;
or,
wherein the processor is further used to execute the computer program to: before binding the PRBs used to transmit the SRS into the at least one PRB bundle according to the PRB bundling size,
   receive SRS block information configured by the base station,
   wherein the processor is further used to execute the computer program to:

divide the PRBs used to transmit the SRS into at least two SRS blocks according to the SRS block information, and bind each of the at least two SRS blocks into at least one respective PRB bundle according to the PRB bundling size.

10. The UE according to claim 9, wherein the precoding is selected from a precoding set stored by the UE, or selected from a precoding set preconfigured by a network side.

11. The UE according to claim 9, wherein the processor is further used to execute the computer program to:
receive SRS configuration information transmitted by the base station, wherein the SRS configuration information comprises transmission location information of the SRS and the indication information used to indicate the PRB bundling size.

\* \* \* \* \*